United States Patent
Oda et al.

(10) Patent No.: US 7,107,213 B2
(45) Date of Patent: *Sep. 12, 2006

(54) DEVICE FOR NORMALIZING VOICE PITCH FOR VOICE RECOGNITION

(75) Inventors: Mikio Oda, Yawata (JP); Tomoe Kawane, Nishinomiya (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 241 days.

This patent is subject to a terminal disclaimer.

(21) Appl. No.: 10/725,438

(22) Filed: Dec. 3, 2003

(65) Prior Publication Data

US 2004/0078195 A1 Apr. 22, 2004

Related U.S. Application Data

(63) Continuation of application No. 09/696,953, filed on Oct. 27, 2000, now Pat. No. 6,687,665.

(30) Foreign Application Priority Data

Oct. 29, 1999 (JP) .................................. 11-309290

(51) Int. Cl.
*G10L 15/02* (2006.01)
(52) U.S. Cl. .................... 704/234; 704/207; 704/243
(58) Field of Classification Search ..................... None
See application file for complete search history.

(56) References Cited

U.S. PATENT DOCUMENTS

| | | | |
|---|---|---|---|
| 4,284,846 A | 8/1981 | Marley | |
| 4,489,434 A | 12/1984 | Moshier | |
| 4,783,807 A | 11/1988 | Marley | |
| 4,803,729 A | 2/1989 | Baker | |
| 4,813,076 A | 3/1989 | Miller | |
| 5,617,486 A | 4/1997 | Chow et al. | |
| 5,644,678 A | 7/1997 | Di Ronza | |
| 5,694,520 A | 12/1997 | Lyberg | |
| 5,790,754 A | 8/1998 | Mozer et al. | |
| 5,839,099 A * | 11/1998 | Munsell et al. | ............. 704/207 |
| 5,960,393 A * | 9/1999 | Cohrs et al. | ................. 704/240 |

(Continued)

FOREIGN PATENT DOCUMENTS

JP 07-271392 10/1995

(Continued)

OTHER PUBLICATIONS

Heironymus J.L.: "Formant Normalisation for Speech Recognition and Vowel Studies" Speech Communications, Elsevier Science Publishers, Amsterdam, NL, vol. 10, No. 5/06, Dec. 10, 1991, pp. 471-478, XP000271195 ISSN: 0167-6393.

(Continued)

*Primary Examiner*—Donald L. Storm
(74) *Attorney, Agent, or Firm*—Wenderoth, Lind & Ponack, L.L.P.

(57) ABSTRACT

In a voice pitch normalization device equipped in a voice recognition device VRAp for recognizing an incoming command voice Sva uttered by any speaker, and used to normalize the incoming command voice to be in an optimal pitch for voice recognition, a target voice generator produces a target voice signal by changing the incoming command voice Svd on the basis of a predetermined degree. A probability calculator calculates a probability indicating a degree of coincidence among the target voice signal and a plurality of words in sample data. A voice pitch changer repeatedly changes the target voice signal in voice pitch until a maximum probability becomes a predetermined probability or greater.

9 Claims, 6 Drawing Sheets

U.S. PATENT DOCUMENTS 5,966,687 A 10/1999 Ojard
6,310,833 B1 10/2001 Guyett et al.
6,687,665 B1 * 2/2004 Oda et al. .................. 704/207

FOREIGN PATENT DOCUMENTS

JP 9-325798 12/1997

OTHER PUBLICATIONS

Arslan L. M.: "Speaker Transformation Algorithum using Segmental Codebooks (STASC)" Speech Communication, Elsevier Science Publishers, Amsterdam, NL, vol. 28, No. 3, Jul. 1999, pp. 211-226, Xp004172905 issn:0167-6393.

Stylianou et al. ("A System for Voice Conversion Based On Probabilistic Classification and a Harmonic Plus Noise Model", Proceedings of the 1998 IEEE International Conference on Acoustics, Speech, and Signal Processing, May 1998).

Lee et al. ("A Very Low Bit Rate Speech Coder Based on a Recognition/Synthesis Paradigm", IEEE Transactions on Speech an Audio Processing, Jul. 2001).

* cited by examiner

DEVICE FOR NORMALIZING VOICE PITCH FOR VOICE RECOGNITION

This application is a continuation of Ser. No. 09/696,953, filed Oct. 27, 2000, now Pat. No. 6,687,665.

BACKGROUND OF THE INVENTION

1. Field of the Invention

The present invention relates to voice recognition devices capable of recognizing human voice no matter who is the speaker, e.g., a low-pitched man, a high-pitched woman or a child, and more specifically, to a device for normalizing voice pitch on the basis of a previously-provided sample voice pitch.

2. Description of the Background Art

Recently, with the progression of digital signal processing technology and LSI of higher performance capabilities and lower price, voice recognition technology became popular with consumer electronic products. The voice recognition technology also improves such products in operability. Such voice recognition device principally works to recognize human voice by converting an incoming command voice into a digital voice signal, and then referring to a voice dictionary for sample voice data previously prepared for comparison. Therefore, for easy comparison, the voice recognition device often requests a user to produce a sound for commanding in a specific manner, or to register the user voice in advance, for example.

The issue herein is specifying a user in the voice recognition device equipped in the consumer electric product badly impairs its usability and thus product value. To get around such problem, the voice recognition device is expected to recognize human voices varied in pitch and speed, no matter who is the speaker. However, as already described, the conventional voice recognition device refers to the voice dictionary for comparison with an incoming command voice. Therefore, if the incoming command voice is differed in pitch or speed to a large extent from the sample in the voice dictionary, the voice recognition device fails to correctly perform voice recognition.

FIG. 7 shows a voice recognition device disclosed in Japanese Patent Laid-Open Publication No.9-325798 (97-325798) for the betterment. A voice recognition device VRAc includes a voice input part 111, voice speed calculation part 112, voice speed change rate determination part 113, voice speed change part 114, and voice recognition part 115.

A sound, or voice produced by a user is taken into the voice input part 111, and is captured as a command voice thereby. The captured command voice is A/D converted into a digital voice signal. The voice speed calculation part 112 receives thus produced digital voice signal, and based thereon, calculates the user's voice speed. The voice speed change rate determination part 113 compares thus calculated voice speed with a reference voice speed, and then determines a speed change rate to compensate for the speed gap therebetween. By referring thereto, the voice speed change part 114 changes the voice speed. Then, the voice recognition part 115 performs voice recognition with respect to the voice-speed-changed voice signal.

Described next is the operation of the voice recognition device VRAc. The user sound is captured as command voice together with background noise by the voice input part 111 via a microphone and an amplifier equipped therein, and then an analog signal including the command voice and the background noise is subjected to A/D conversion by an equipped A/D converter. From the voice included in thus obtained digital voice signal, the voice speed calculation part 112 extracts a sound unit which corresponds to the command voice, and calculates the voice speed for the sound unit based on the time taken for the user to produce or utter the sound.

Here, assuming that the time taken to utter the sound unit (hereinafter, "one-sound unit utterance time" is Ts, and a reference time for utterance of the sound unit (hereinafter, "one-sound unit reference time") is Th. Based thereon, the voice speed change rate determination part 113 determines a speed change rate α by comparing 1/Ts and 1/Th with each other, which denote a one-sound unit utterance speed and a one-sound unit reference speed, respectively. The speed change rate a is calculated by the following equation (1).

$$\alpha = Ts/Th \quad (1)$$

The equation (1) tells, when the one-sound unit utterance time Ts is shorter than the one-sound unit reference time Th, i.e., when an incoming sound voice speed is faster than that workable by the voice recognition device VRAc, the speed change rate α is smaller than 1. If this is the case, the incoming command voice should be decreased in speed. Conversely, when the one-sound unit utterance time Ts is longer than the one-sound unit reference time Th, i.e., the incoming command voice speed is slower, the speed change rate a becomes greater than 1. In such case, the incoming command voice should be increased in speed.

In the voice recognition device VRAc, the voice speed change part 114 refers to the speed change rate a to keep the command voice signal constant in speed, and produces a speed-changed command voice signal. The voice recognition part 115 performs voice recognition with respect to the speed-changed command voice signal, and outputs a result obtained thereby.

Such speed change can be easily done under the recent digital technology. For example, in order to decrease the speed of voice, the voice signal is added with several vowel waveforms having correlation with the sound unit included in the command voice. To increase the speed of voice, on the other hand, such vowel waveform is decimated from the command voice signal for several times.

This is a technique for changing the voice speed without affecting the pitch of the command voice. That is, this technique is effective for voice recognition in the case that the user speaks faster or slower than the dictionary voice.

The above-described conventional voice recognition device VRAc works well for voice recognition when the user voice speed is differed to a large extent from the one-sound unit reference speed 1/Th. However, this is not applicable if the user's voice is differently pitched compared with a reference pitch.

In detail, although the voice recognition device VRAc can manage with various types of speakers varied in frequency range, i.e., a low-pitched man, a high-pitched woman or a child, voice recognition to be achieved thereby is not satisfactory.

For the fast speaker speaking at a high speed, it is possible to ask him/her to speak moderately, but it is impossible to speak in a different voice pitch. Note that the speaker's voice pitch is essentially determined by his/her throat especially in shape and size. Since the speaker cannot change his/her throat in shape or size by his/her intention, the voice pitch cannot be changed by his/her intention, as well.

For realizing a voice recognition of various voices with different pitches, the voice recognition device VRAc shall store a great number of sample voice data groups each correspond to different speakers such as a man, a woman, or a child speaking in different pitch. Further, the voice recognition device VRAc shall select one group among those great number of sample voice data groups, according to the incoming command voice.

In order to avoid such nuisance, it seems effective to process the incoming command voice to a pitch optimal for voice recognition. However, since incoming command voices vary greatly in pitch according to the speaker, it is substantially impossible to process the incoming command voice to a desired pitch at one dash. Even in the desired pitch, the correct voice recognition cannot be secured because the content of incoming command voice or a speaking manner may spoil the voice recognition result. As known from this, the pitch considered optimal for voice recognition in terms of voice recognition device or sample voice data is not necessarily optimal.

Therefore, an object of the present invention is to provide a device for normalizing voice pitch to a level considered optimal for voice recognition.

SUMMARY OF THE INVENTION

A first aspect of the present invention is directed to a voice pitch normalization device equipped in a voice recognition device for recognizing an incoming command voice uttered by any speaker based on sample data for a plurality of words, and used to normalize the incoming command voice to be in an optimal pitch for voice recognition, the device comprising:

a target voice generator for generating a target voice signal by changing the incoming command voice on a predetermined degree basis;

a probability calculator for calculating a probability indicating a degree of coincidence among the target voice signal and the words in the sample data; and a voice pitch changer for repeatedly changing the target voice signal in voice pitch until a maximum of the probabilities reaches a predetermined probability or higher.

As described above, in the first aspect, an incoming command voice is so adjusted in voice pitch that a probability indicating a degree of coincidence among the incoming command voice and sample voice data for a plurality of words becomes a predetermined value or greater. Therefore, the incoming command voice can be normalized in a fast and correct manner.

According to a second aspect, in the first aspect, when the maximum of the probabilities is smaller than the predetermined probability, the voice pitch changer includes a voice pitch adjustment for increasing or decreasing the target voice signal on the predetermined degree basis.

As described above, in the second aspect, the incoming command voice can be normalized even if being lower or higher in voice pitch compared with the sample voice data.

According to a third aspect, in the second aspect, the voice pitch normalization device further comprises:

a memory for temporarily storing the incoming command voice;

a read-out controller for reading out a string of the incoming command voice from the memory, and generating the target voice signal; and a read-out clock controller for generating a read-out clock signal with a timing clock determined by frequency, and outputting the timing clock to the memory to change, with the timing specified thereby, the target voice signal in frequency on the predetermined degree basis.

According to a fourth aspect, in the second aspect, the target voice signal is increased in voice pitch on the predetermined degree basis started from a pitch level of the incoming command voice.

According to a fifth aspect, in the fourth aspect, the target voice signal is limited in voice pitch up to a first predetermined pitch, and when the maximum of the probabilities fails to reach the predetermined probability or higher before the target voice signal reaching the first predetermined pitch, the target voice signal is decreased in voice pitch on the predetermined degree basis started from the pitch level of the incoming command voice.

As described above, in the fifth aspect, the capability of the voice recognition device appropriately determines a range for normalizing the incoming command voice.

According to a sixth aspect, in the fifth aspect, the target voice signal is limited in voice pitch down to a second predetermined pitch, and when the maximum of the probabilities fails to reach the predetermined probability or higher before the target voice signal reaches the second predetermined pitch, the incoming command voice is stopped being normalized.

As described above, in the sixth aspect, the capability of the voice recognition device appropriately determines a range for normalizing the incoming command voice.

According to a seventh aspect, in the second aspect, the target voice signal is decreased in voice pitch on the predetermined degree basis started from a pitch level of the incoming command voice.

According to an eighth aspect, in the seventh aspect, the target voice signal is limited in voice pitch down to a third predetermined pitch, and when the maximum of the probabilities fails to reach the predetermined probability or higher before the target voice signal reaches the third predetermined pitch, the target voice signal is increased in voice pitch on the predetermined degree basis started from the pitch level of the incoming command voice.

As described above, in the eighth aspect, the capability of the voice recognition device appropriately determines a range for normalizing the incoming command voice.

According to a ninth aspect, in the eighth aspect, the target voice signal is limited in voice pitch up to a fourth predetermined pitch, and when the maximum of the probabilities fails to reach the predetermined probability or higher before the target voice signal reaches the fourth predetermined pitch, the incoming command voice is stopped being normalized.

A tenth aspect of the present invention is directed to a voice recognition device for recognizing an incoming command voice optimally normalized for voice recognition based on sample data for a plurality of words, the device comprising:

a target voice generator for generating a target voice signal by changing the incoming command voice on a predetermined degree basis;

a probability calculator for calculating a probability indicating a degree of coincidence among the target voice signal and the words in the sample data; and a voice pitch changer for repeatedly changing the target voice signal in voice pitch until a maximum of the probabilities reaches a predetermined probability or higher.

As described above, in the tenth aspect, an incoming command voice is so adjusted in voice pitch that a probability indicating a degree of coincidence among the incoming command voice and sample voice data for a plurality of words becomes a predetermined value or greater. Therefore, the incoming command voice can be normalized in a fast and correct manner.

According to an eleventh aspect, in the tenth aspect, when the maximum of the probabilities is smaller than the predetermined probability, the target voice generator includes a voice pitch adjustment for increasing or decreasing the target voice signal on the predetermined degree basis.

As described above, in the eleventh aspect, the incoming command voice can be normalized even if being lower or higher in voice pitch compared with the sample voice data.

According to a twelfth aspect, in the eleventh aspect, the voice recognition device further comprises:
a memory for temporarily storing the incoming command voice;
a read-out controller for reading out a string of the incoming command voice from the memory, and generating the target voice signal; and
a read-out clock controller for generating a read-out clock signal with a timing clock determined by frequency, and outputting the timing clock to the memory to change, with the timing specified thereby, the target voice signal in frequency on the predetermined degree basis.

According to a thirteenth aspect, in the eleventh aspect, the target voice signal is increased in voice pitch on the predetermined degree basis started from a pitch level of the incoming command voice.

As described above, in the thirteenth aspect, the capability of the voice recognition device appropriately determines a range for normalizing the incoming command voice.

According to a fourteenth aspect, in the thirteenth aspect, the target voice signal is limited in voice pitch up to a first predetermined pitch, and when the maximum of the probabilities fails to reach the predetermined probability or higher before the target voice signal reaches the first predetermined pitch, the target voice signal is decreased in voice pitch on the predetermined degree basis started from the pitch level of the incoming command voice.

As described above, in the fourteenth aspect, the capability of the voice recognition device appropriately determines a range for normalizing the incoming command voice.

According to a fifteenth aspect, in the fourteenth aspect, the target voice signal is limited in voice pitch down to a second predetermined pitch, and when the maximum of the probabilities fails to reach the predetermined probability or higher before the target voice signal reaches the second predetermined pitch, the incoming command voice is stopped being normalized.

According to a sixteenth aspect, in the eleventh aspect, the target voice signal is decreased in voice pitch on the predetermined degree basis started from a pitch level of the incoming command voice.

According to a seventeenth aspect, in the sixteenth aspect, the target voice signal is limited in voice pitch down to a third predetermined pitch, and when the maximum of the probabilities fails to reach the predetermined probability or higher before the target voice signal reaches the third predetermined pitch, the target voice signal is increased in voice pitch on the predetermined degree basis started from the pitch level of the incoming command voice.

As described above, in the seventeenth aspect, the capability of the voice recognition device appropriately determines a range for normalizing the incoming command voice.

According to an eighteenth aspect, in the seventeenth aspect, the target voice signal is limited in voice pitch up to a fourth predetermined pitch, and when the maximum of the probabilities fails to reach the predetermined probability or higher before the target voice signal reaches the fourth predetermined pitch, the incoming command voice is stopped being normalized.

A nineteenth aspect of the present invention is directed to a voice pitch normalization method utilized for a voice recognition device for recognizing an incoming command voice uttered by any speaker based on sample data for a plurality of words, and applied to normalize the incoming command voice to be in an optimal pitch for voice recognition, the method comprising:
a step of generating a target voice signal by changing the incoming command voice on a predetermined degree basis;
a step of calculating a probability indicating a degree of coincidence among the target voice signal and the words in the sample data; and
a step of repeatedly changing the target voice signal in voice pitch until a maximum of the probabilities reaches a predetermined probability or higher.

As described above, in the nineteenth aspect, an incoming command voice is so adjusted in voice pitch that a probability indicating a degree of coincidence among the incoming command voice and sample voice data for a plurality of words becomes a predetermined value or greater. Therefore, the incoming command voice can be normalized in a fast and correct manner.

According to a twentieth aspect, in the nineteenth aspect, the voice pitch normalization method further comprises a step of, when the maximum of the probabilities is smaller than the predetermined probability, increasing or decreasing the target voice signal on the predetermined degree basis.

As described above, in the twentieth aspect, the incoming command voice can be normalized even if being lower or higher in voice pitch compared with the sample voice data.

According to a twenty-first aspect, in the twentieth aspect, the voice pitch normalization method further comprises:
a step of temporarily storing the incoming command voice;
a step of generating the target voice signal from a string of the temporarily stored incoming command voice; and
a step of determining a timing clock by frequency, in such manner as to change, with the timing specified thereby, the target voice signal in frequency on the predetermined degree basis.

According to a twenty-second aspect, in the twentieth aspect, the voice pitch normalization method further comprises a step of increasing the target voice signal in voice pitch on the predetermined degree basis started from a pitch level of the incoming command voice.

According to a twenty-third aspect, in the twenty-second aspect, the target voice signal is limited in voice pitch up to a first predetermined pitch, and
the method further comprises a step of, when the maximum of the probabilities fails to reach the predetermined probability or higher before the target voice signal reaches the first predetermined pitch, decreasing the target voice signal in voice pitch on the predetermined degree basis started from the pitch level of the incoming command voice.

As described above, in the twenty-third aspect, the capability of the voice recognition device appropriately determines a range for normalizing the incoming command voice.

According to a twenty-fourth aspect, in the twenty-third aspect, the target voice signal is limited in voice pitch down to a second predetermined pitch, and the method further comprises a step of, when the maximum of the probabilities fails to reach the predetermined probability or higher before the target voice signal reaches the second predetermined pitch, stopping normalizing the incoming command voice.

As described above, in the twenty-fourth aspect, the capability of the voice recognition device appropriately determines a range for normalizing the incoming command voice.

According to a twenty-fifth aspect, in the twentieth aspect, the voice pitch normalization method further comprises a step of decreasing the target voice signal in voice pitch on the predetermined degree basis started from a pitch level of the incoming command voice.

According to a twenty-sixth aspect, in the twenty-fifth aspect, the target voice signal is limited in voice pitch down to a third predetermined pitch, and
the method further comprises a step of, when the maximum of the probabilities fails to reach the predetermined probability or higher before the target voice signal the third predetermined pitch, increasing the target voice signal in voice pitch on the reaches predetermined degree basis started from the pitch level of the incoming command voice.

As described above, in the twenty-sixth aspect, the capability of the voice recognition device appropriately determines a range for normalizing the incoming command voice.

According to a twenty-seventh aspect, in the twenty-sixth aspect, the target voice signal is limited in voice pitch down to a fourth predetermined pitch, and
the method further comprises a step of, when the maximum of the probabilities fails to reach the predetermined probability or higher before the target voice signal reaches the fourth predetermined pitch, stopping normalizing the incoming command voice.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
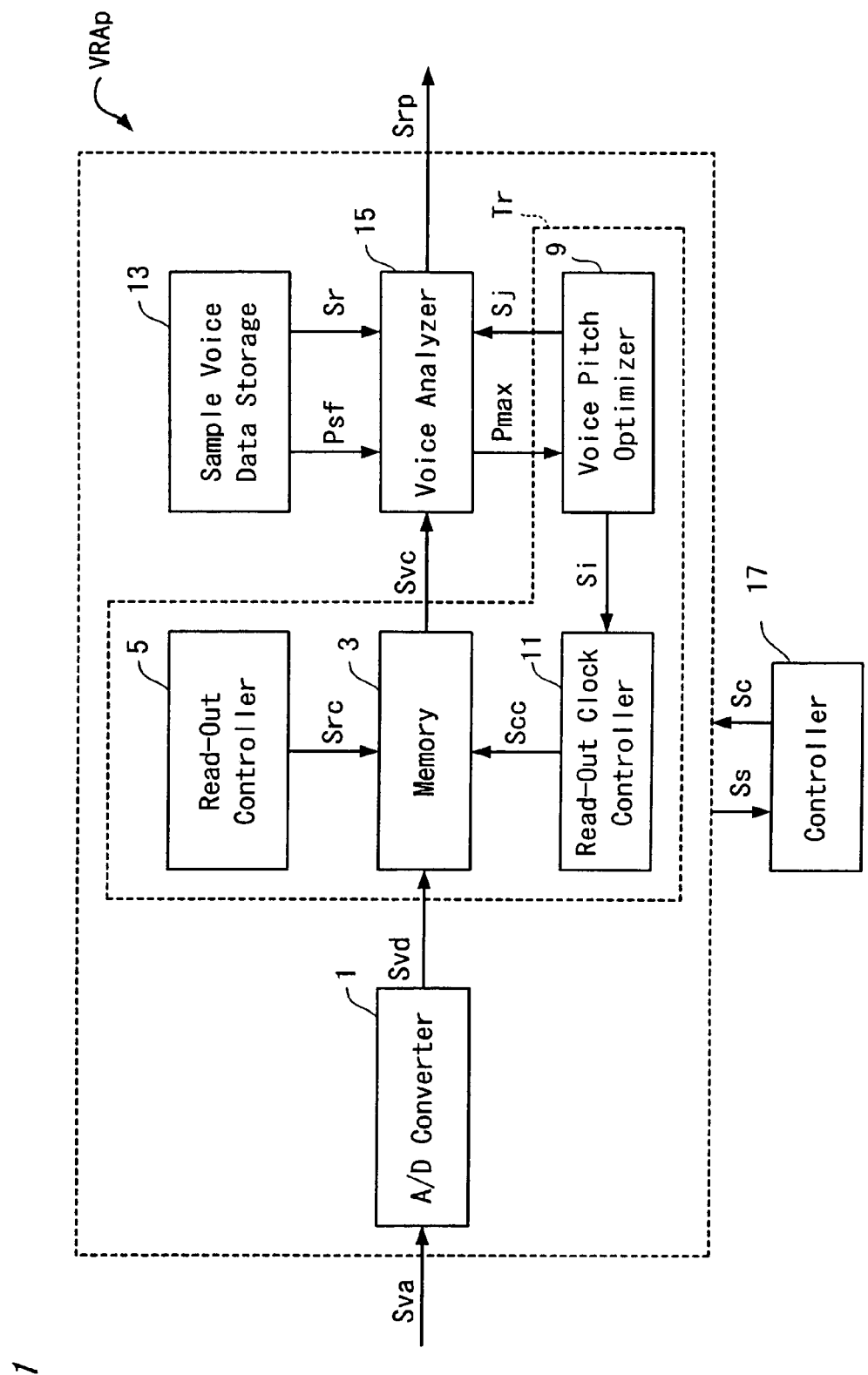
FIG. 1 is a block diagram showing the structure of a voice recognition device equipped with a voice pitch normalization device according to an embodiment of the present invention.

With reference to FIG. 1, described is a voice recognition device incorporated with a device for normalizing voice pitch according to an embodiment of the present invention. A voice recognition device VRAp includes an A/D converter 1, voice pitch normalization device Tr, sample voice data storage 13, and voice analyzer 15. The sample voice data storage 13 stores frequency patterns Psf for each of a plurality of words to be referred to at voice recognition. The frequency patterns Psf are outputted at a predetermined timing. Here, a sound, or voice produced by a user is taken into a voice input means (not shown) composed of a microphone and an amplifier, and is then supplied to the voice recognition device VRAp as an analog signal Sva.

Such structured voice recognition device VRAp outputs, to a controller 17, a signal Ss which indicates the operating status of the constituents therein. In response thereto, the controller 17 produces a control signal Sc for controlling the operation of those constituents, that is, the comprehensive operation of the voice recognition device VRAp. Note herein that; the operating status signal Ss, the control signal Sc, and the controller 17 are well known, and therefore are not described unless otherwise required.

The A/D converter 1 applies the analog voice signal Sva to A/D conversion, and produce a digital voice signal Svd. The voice pitch normalization device Tr changes the pitch of the digital voice signal Svd by a predetermined level, and produces a pitch-normalized digital voice signal Svc whose pitch is normalized toward an optimal pitch for the voice recognition device VRAp. This pitch-normalized digital voice signal Svc is subject to the voice recognition process to perceive the command the user tried to express his/her intention therefrom. From this point of view, the pitch-normalized digital voice signal Svc is a command voice expressed by a word(s) orally.

The voice analyzer 15 applies FFT (fast Fourier Transform) to the pitch-normalized digital voice signal Svc, and obtains a frequency pattern Psvc (not shown) thereof. From the sample voice data storage 13, the voice analyzer 15 successively reads out all the sample voice data. Here, the sample voice data is composed of plural pairs of frequency pattern Psf and code Sr which correspond to different words. The voice analyzer 15 also reads out, from the sample voice data storage 13, the sample voice data for each word. Here, the sample voice data is composed of the frequency pattern Psf and a code Sr. The voice analyzer 15 then compares, for each word, the frequency pattern Psf in the sample voice data with the frequency pattern Psvc of the pitch-normalized digital voice signal Svc. In this manner, a probability P is calculated indicating the degree of coincidence between the frequency pattern Psf and the frequency pattern Psvc.

The calculation of probability P is made under a conventional technology typified by the Hidden Markov Model, which will be described later. Among the probabilities P calculated for all of the words found in the sample voice data, the maximum value is referred to as a maximum probability Pmax. The code Sr corresponding to the maximum probability Pmax is referred to as a maximum probability code Srp.

Based on the maximum probability Pmax, the voice pitch normalization device Tr authorizes a word whose frequency pattern Psf coincides with the frequency pattern Psvc as being recognized. For the authorization, a predetermined threshold value called coincidence reference Pth is referred to. Specifically, the voice pitch normalization device Tr determines a word having the maximum probability Pmax greater than the coincidence reference Pth as coinciding with the incoming command voice. Then, the voice pitch normalization device Tr authorizes that the incoming command voice is recognized correctly.

When the authorization is established, the voice pitch normalization device Tr outputs a coincidence authorization signal Sj to the voice analyzer 15. In response to the signal Sj, the voice analyzer 15 outputs a maximum probability code Srp indicative of the authorized word (voice authorized sample data). In this sense, the maximum probability code Srp is referred to as recognition code Srp.

On the other hand, when the maximum probability Pmax is smaller than the coincidence reference Pth in value, the voice pitch normalization device Tr adjusts the digital voice signal Svd in pitch only by a predetermined degree, and thus again produces the pitch-normalized digital voice signal Svc. Then, based thereon, the above procedure is repeated until any word is authorized. Specifically, the comparison in frequency pattern is done for each word in the sample voice data. However, the authorization process is applied only to the word having the maximum probability Pmax.

Herein, as shown in FIG. 1, the voice pitch normalization device Tr includes a memory 3, read-out controller 5, voice pitch optimizer 9, and read-out clock controller 11. The voice pitch optimizer 9 authorizes coincidence between the pitch-normalized digital voice signal Svc and a specific word in the sample voice data on the basis of the maximum probability Pmax provided from the voice analyzer 15.

To be specific, when the coincidence reference Pth is greater than the maximum probability Pmax in value, the voice pitch optimizer 9 does not authorize such coincidence. If this is the case, the voice pitch optimizer 9 outputs a voice pitch adjusting signal Si to the read-out clock controller 11. This is done to adjust the pitch-normalized digital voice signal Svc provided the voice analyzer 15 by a pitch adjustment degree Ni for the next authorization process.

Herein, a character i found in both the pitch adjustment degree Ni and the voice pitch adjusting signal Si is an index specifying the degree for voice pitch adjustment. In this embodiment, although the pitch adjustment index i is exemplarily a positive or negative integer, it is not restrictive and arbitrary. In this embodiment, the pitch adjustment index i presumably matches, in value, to a pitch adjustment cycle of the pitch-normalized digital voice signal Svc. Herein, the pitch adjustment index i thus denotes the pitch adjustment cycle if necessary.

In response to the voice pitch adjusting signal Si, the read-out clock controller 11 outputs a read-out clock Scc to the memory 3. This read-out clock Scc changes the pitch-normalized digital voice signal Svc in voice pitch (high or low) by the predetermined degree of Ni.

The read-out controller 5 monitors the digital voice signal Svd in the memory 3, and produces a read-out control signal Src. The read-out control signal Src so controls the memory 3 as to extract a portion out of the digital voice signal Svd with a timing specified by the read-out clock Scc. The portion is an independent sound unit(s) structuring the incoming command voice included in the digital voice signal Svd, and is read out as the pitch-normalized digital voice signal Svc.

The memory 3 thus reads out the digital voice signal Svd stored therein with the timing specified by the read-out clock Scc so that the pitch-normalized digital voice signal Svc corresponding to the incoming command is outputted. The pitch-normalized digital voice signal Svc is a signal obtained by changing the digital voice signal Svd in voice pitch by the pitch adjustment degree Ni, which is specified by the voice pitch adjusting Si.

The pitch adjustment degree Ni does not have to be constant but can be arbitrarily variable. Surely, the capability of the voice recognition device VRAp (especially the combination of the voice analyzer 15 and the sample voice data) naturally determines the acceptable range of the pitch adjustment degree Ni. Hereinafter, such pitch-normalized digital signal Svc adjusted by the pitch adjustment degree Ni is referred to as pitch-normalized digital voice signal Svc(Ni). If required, other signals are also referred to in the same manner.

With respect to the pitch-normalized digital voice signal Svc whose pitch has been adjusted, the voice analyzer 15 calculates the probability P for every word (M words) in the sample voice data stored in the sample voice data storage 13. Here, M is an arbitrary integer equal to or greater than 1, and equal to the number of codes Sr having the frequency patterns Psf. In this sense, M is the total number of words in sample voice data.

Figure 2:
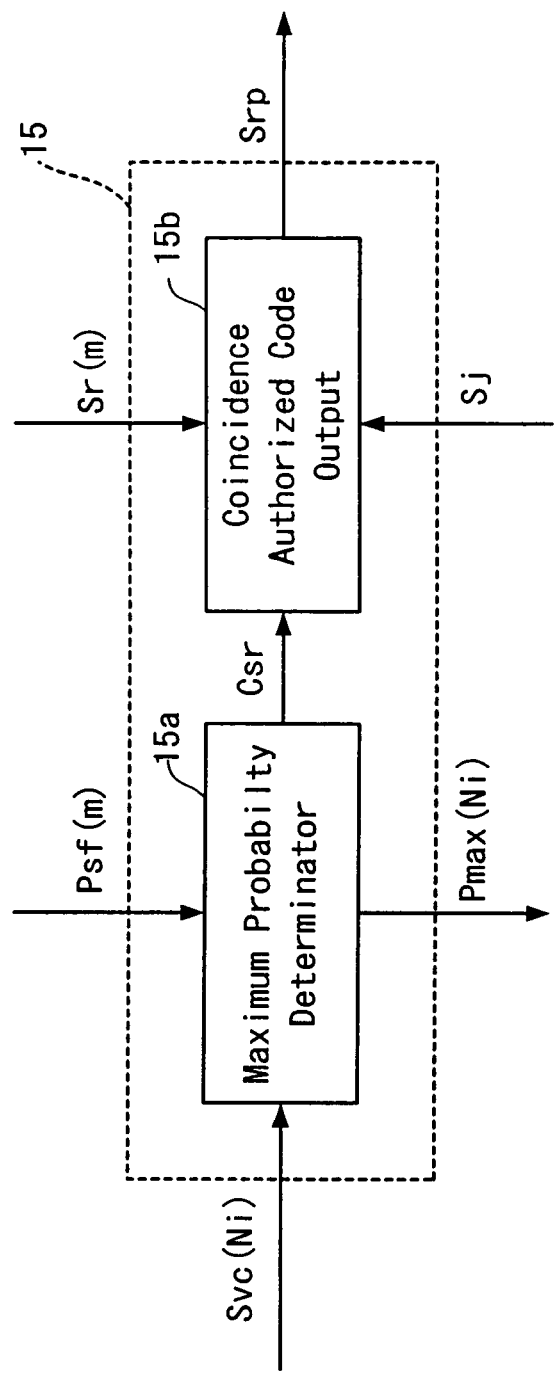
FIG. 2 is a block diagram showing a voice analyzer of FIG. 1 in detail.

As shown in FIG. 2, the voice analyzer 15 includes a maximum probability determinator 15a and a coincidence authorized code output 15b. The sample voice data storage 13 outputs a frequency pattern Psf(m) to the maximum probability determinator 15a, and a code Sr(m) corresponding thereto simultaneously to the coincidence authorized code output 15b.

The coincidence authorized code output 15b retains the value of the code Sr(m) until the next code Sr(m+1) comes. Herein, m is an arbitrary integer from 1 to M inclusive, and is a parameter indicating any one code or any one of frequency patterns Psf1 to PsfM corresponding to the M words in the sample voice data stored in the sample voice data storage 13.

Based on the frequency patterns Psf(m) provided by the sample voice data storage 13 and the pitch-normalized digital voice signal Svc(Ni), the maximum probability determinator 15a finds a maximum probability Pmax(Ni) for that pitch-normalized digital voice signal Svc(Ni). Then the maximum probability determinator 15 outputs the maximum probability Pmax(Ni) to the voice pitch optimizer 9, and a code retaining signal Csr to the coincidence authorized code output 15b.

In response to the code retaining signal Csr, the coincidence authorized code output 15b retains the current code Sr(m) as an authorization potential code Srp As will be later described, under the condition of the probability P (i.e., maximum probability Pmax(Ni)) being the coincidence reference Pth or greater, the code Sr for a word having the maximum probability Pmax(Ni) is authorized as being the code Srp corresponding to the digital voice signal Svd equivalent to the incoming command voice (analog voice signal Sva). This is the reason why the code Sr(m) indicating the maximum probability Pmax(Ni) is identified as being the authorization potential code Srp Herein, such authorized code is identified as being the coincidence authorized code Srp.

The coincidence authorized code output 15b outputs the coincidence authorized code Srp external to the voice recognition device VRAp based on the code retaining signal Csr from the maximum probability determinator 15a, the code Sr(m) from the sample voice data storage 13, and the coincidence authorization signal Sj from the voice pitch optimizer 9. More specifically, after receiving the pitch-normalized digital voice signal Svc(Ni), the maximum probability determinator 15a keeps the signal until another pitch-normalized digital voice signal Svc(Ni) comes, having been adjusted in pitch to a further degree.

The sample voice data storage 13 successively outputs the previously stored frequency patterns Psf(m) corresponding to the words. With every output thereof, the frequency pattern Psvc(Ni) of the digital voice signal Svc(Ni) is compared to calculate the probability P(m). If thus calculated probability P(m) exceeds the probability P(m−β) so far considered maximum, the calculated probability P(Ni) is updated with the probability P(m). Here, β is an arbitrary integer from 1 to m inclusive.

In response to such update, the maximum probability determinator 15*a* outputs the code retaining signal Csr to the coincidence authorized code output 15*b*. The code retaining signal Csr indicates that the probability P(m) of the current frequency pattern Psf(m) is so far considered maximum. This processing is carried out with respect to all of the frequency patterns Psf1 to PsfM for M words stored in the sample voice data storage 13, and then the maximum probability Pmax(Ni) is determined. Thereafter, the maximum probability Pmax(Ni) is outputted to the voice pitch optimizer 9 for authorization. Also, the authorization signal Sr(m) for the word indicating the maximum probability Pmax(Ni) is stored in the coincidence authorized code output 15*b* as the authorization potential code Srp'.

In the case that the code retaining signal Csr is provided by the maximum probability determinator 15*a*, the current code Sr(m) so far considered having the maximum probability P is retained as the authorization potential code Srp' until the next code retaining signal Csr comes. When it comes, the code Sr(m+γ) at that time is regarded as the authorization potential code Srp'. This makes possible for the code Sr considered potentially as having the maximum probability Pmax(Ni) to always be stored as the authorization potential code Srp'. Herein, γ is an arbitrary integer from 1 to (M−m) inclusive inclusively.

When the pitch-normalized digital voice signal Svc(Ni) is thoroughly compared with every sample voice data (frequency pattern Psf(m)) corresponding thereto, the probability P maximum in value among those found in the maximum probability determinator 15*a* is outputted to the voice pitch optimizer 9 as the maximum probability Pmax(Ni). In the voice pitch optimizer 9, the maximum probability Pmax(Ni) is compared with the coincidence reference Pth.

When the maximum probability Pmax(Ni) is equal to or greater than the coincidence reference Pth, the voice pitch optimizer 9 outputs the coincidence authorization signal Sj to the coincidence authorized code output 15*b*. The coincidence authorization signal Sj authorizes the authorization potential code Srp stored in the coincidence authorized code output 15*b* as being the coincidence authorized code Srp. In response thereto, the coincidence authorized code output 15*b* authorizes the word having the maximum probability Pmax(Ni) as correctly recognizing the incoming command voice, and thus outputs the coincidence authorized code Srp.

In other words, the coincidence authorized code output 15*b* never outputs the coincidence authorized code Srp without receiving the coincidence authorization signal Sj from the voice pitch optimizer 9. The coincidence authorized code Srp means that the probability P (maximum probability Pmax) with respect to the pitch-normalized digital voice signal Svc(Ni) is greater than the coincidence reference Pth.

In detail, the voice pitch optimizer 9 compares, with the coincidence reference Pth, the maximum probability Pmax of the code Sr corresponding to the pitch-normalized digital voice signal Svc(Ni) at the current processing time (i). Then, the voice pitch optimizer 9 determines whether the word (authorization potential code Srp') having the maximum probability Pmax at the current processing time (i) has been so far correctly recognized or not. In this case, the authorization potential code Srp(i) at the current processing time does not always fall on the authorization potential code Srp' (i−1) at the previous processing time.

When the maximum probability Pmax is equal to or greater than the coincidence reference Pth, the voice pitch optimizer 9 authorizes the authorization potential code Srp' coinciding with the pitch-normalized digital voice signal Svc, and then outputs the coincidence authorization signal Sj to the voice analyzer 15 for that information. With the coincidence authorization signal Sj received, the voice analyzer 15 outputs the authorization potential code Srp stored therein as the coincidence authorized code Srp.

Figure 3:
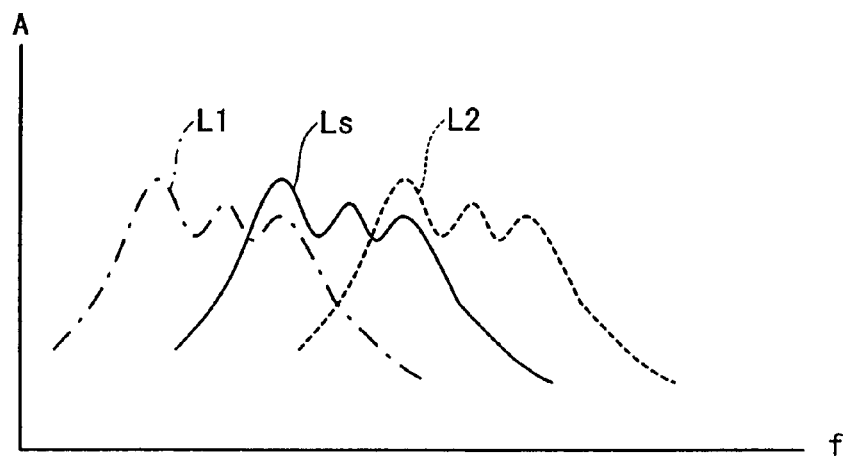
FIG. 3 is a diagram showing frequency spectra of voices varied in pitch.
Figure 4:
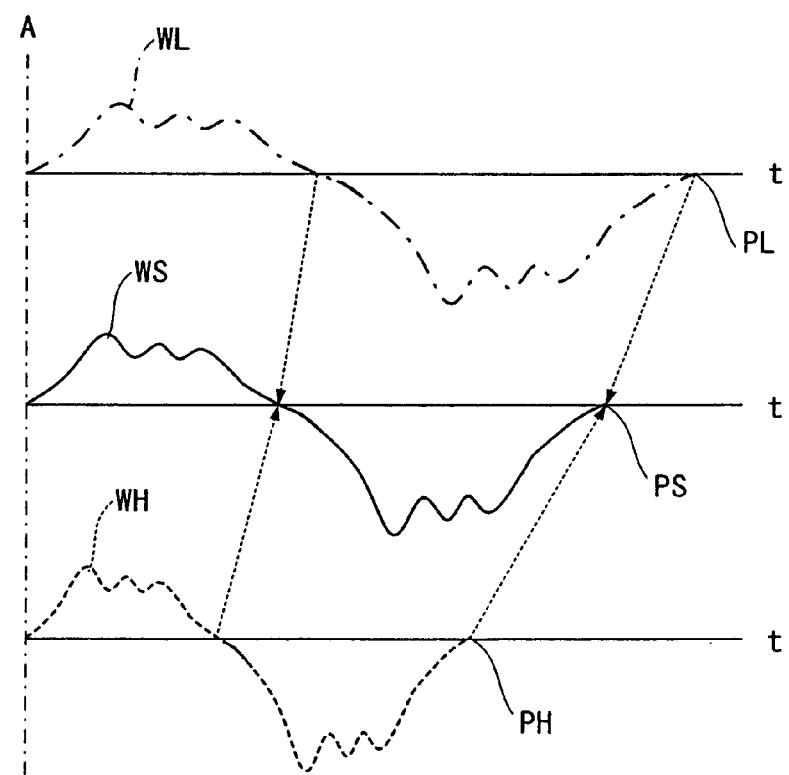
FIG. 4 is a diagram for assistance of explaining exemplary pitch change of voice waveforms, and a pitch change method applied thereto.

Next, with reference to FIGS. 3 and 4, described is the basic operational principle of the voice recognition device VRAp.

FIG. 3 shows exemplary frequency spectra (frequency patterns Psvc) obtained by subjecting the pitch-normalized digital voice signal Svc to fast Fourier transform in the voice analyzer 15. In the drawing, a lateral axis indicates frequency f, and a longitudinal axis indicates strength A. Therein, exemplarily, a one-dot line L1 indicates a typical frequency spectrum of the digital voice signal Svd including a voice uttered by a man, and a broken line L2 indicates a typical frequency spectrum of the digital voice signal Svd including a voice uttered by a woman or a child.

A solid line Ls indicates an exemplary frequency spectrum (frequency pattern Psf) of a word (code Sr) stored in the sample voice data storage 13 as the sample voice data for voice recognition. The word is the one corresponding to the frequency spectra of voices indicated by the lines L1 and L2. Generally, even if the same voice (word) is uttered, as indicated by the one-dot line L1, the frequency spectrum for the man covers the lower frequency region as compared with the sample voice. On the other hand, as indicated by the broken line L2, the frequency spectrum for the woman or child covers the higher frequency region.

By taking such frequency spectra into consideration, the voice analyzer 15 goes through comparison between the frequency pattern Psvc of the pitch-normalized digital voice signal Svc typified by line L1 or L2, and the frequency patterns Psf(m) for every word (Sr(m)) in the sample voice data typified by the line Ls. Then, the degree of coincidence P(m) is calculated for every word (Sr(m)). Such calculation of the probability P(m) can be done under the conventional technology such as the Hidden Markov Model.

The sample voice data (Ls) stored in the sample voice data storage 13 is often set to be in the middle level of the man voice (L1) and the woman's voice (L2). Therefore, if their voices are extremely high or low, the frequencies (L1, L2) thereof are different from that of the sample voice data (Ls) to a greater degree. Consequently, even if the word is correct, the probability P thereof cannot reach the coincidence reference Pth, rendering voice correction a failure.

Therefore, in the present invention, if the maximum probability Pmax(m) among the M words stored in the sample voice data does not satisfy the coincidence reference Pth, the pitch level of the pitch-normalized digital voice signal Svc is regarded as the reason. Thus, the pitch level is adjusted (high or low).

To be specific, when the maximum probability Pmax(m) detected by the voice analyzer 15 is determined as not reaching the coincidence reference Pth by the voice pitch optimizer 9, the voice pitch adjusting signal Si is outputted to the read-out clock controller 11. The voice pitch adjusting signal Si has been so set as to adjust the pitch-normalized digital voice signal Svc in voice pitch by the predetermined degree of Ni.

As described in the foregoing, the memory 3 outputs the pitch-normalized digital voice signal Svc(Ni) which has been adjusted in voice pitch by the degree of Ni to the voice analyzer 15. Therein, the pitch-normalized digital voice signal Svc(Ni) is subjected to the above-described voice analysis so that the maximum probability Pmax is calculated. In this case, the word which had indicated the maximum probability Pmax(i) during voice analysis at the previous processing time (i) does not necessarily indicate the maximum probability Pmax(i) at the current processing time (i).

This is because, as described by referring to FIG. 3, the probability P(m) varies to a considerable degree depending on the proximity between the frequency pattern Psvc(Ni) of the pitch-normalized digital voice signal Svc(Ni) exemplarily indicated by the lines L1 or L2, and the frequency pattern Psf(m) of the sample voice exemplarily indicated by the line Ls. As a result, when the proximity of voice pitch is insufficient, a word not corresponding to the pitch-normalized digital voice signal Svc may become erroneously higher in probability P as compared with a word corresponding thereto.

Here, the closer the proximity of voice pitch, the greater the possibility P of the correct word. Focusing on this respect in this invention, the coincidence reference Pth is set according to the capability of the voice recognition device VRAp. When the maximum probability Pmax is equal to or greater than the coincidence reference Pth, the word corresponding thereto is authorized as being correctly recognized by voice.

That is, in the present invention, the pitch of the pitch-normalized digital voice signal Svc is normalized through adjustment until the maximum probability Pmax satisfies the coincidence reference Pth. In this manner, finding the correct word is based not on every word, but only on the maximum probability Pmax, whereby load on data processing is considerably lessened. Also, every single word included in the sample voice data is targeted for voice recognition, thereby rendering voice recognition fast and correct.

With reference to FIG. 4, the voice pitch normalization device Tr (read-out clock controller 11) is described for its pitch change to a further degree. In the drawing, a lateral axis indicates time t, and a longitudinal axis indicates voice strength A. A waveform WS shows the change of a voice waveform (frequency Psf(m)) with time stored in the sample voice data storage 13.

A waveform WL shows a frequency pattern Psvc (e.g., a man voice) lower in pitch than a waveform WS of the sample voice data, while a waveform WH shows a frequency pattern (e.g., a woman's or child's voice) higher in pitch than the waveform WS of the sample voice data. In FIG. 4, reference characters PL, PS, and PH denote, respectively, one period of the waveforms WS, WL, and WH. The period PL and PH each correspond to a reciprocal of a basic voice frequency fi, while the period PS corresponds to a reciprocal of a basic sample voice frequency fs.

To change the waveform WL in voice pitch in accordance with the waveform WS, the waveform WL only needs to be read by a clock faster than a sampling clock used to subject an incoming command voice waveform to A/D conversion. In order to make such change at once, the frequency of the read-out clock Scc may be set to multiples of PL/PS. If set, the voice pitch also becomes adjusted by the multiples of PL/PS. In consideration of the period PL of the actual pitch-normalized digital voice signal Svc being variable, the pitch is preferably adjusted by the predetermined degree of Ni. Therefore, in the invention, the frequency of the read-out clock Scc is set to a value corresponding to the pitch adjustment value of Ni. Herein, the read-out clock Scc is similarly set in the case that the waveform WH is changed according to the waveform WS.

As such, the pitch of the digital voice signal Svd is changed in accordance with that of the sample voice so that the pitch-normalized digital voice signal Svc is obtained. The problem herein is, increasing the pitch leads to the time axis of the voice waveform becoming shorter, and vice versa, and also changes the speed. To adjust the speed, addition or decimation of the vowel waveforms is done. Since this is the known technique and is not the object of the present invention, neither description nor indication is made herein. Moreover, the frequency of the read-out clock is easily changed with a known technique utilizing a dividing master clock.

Figure 5:
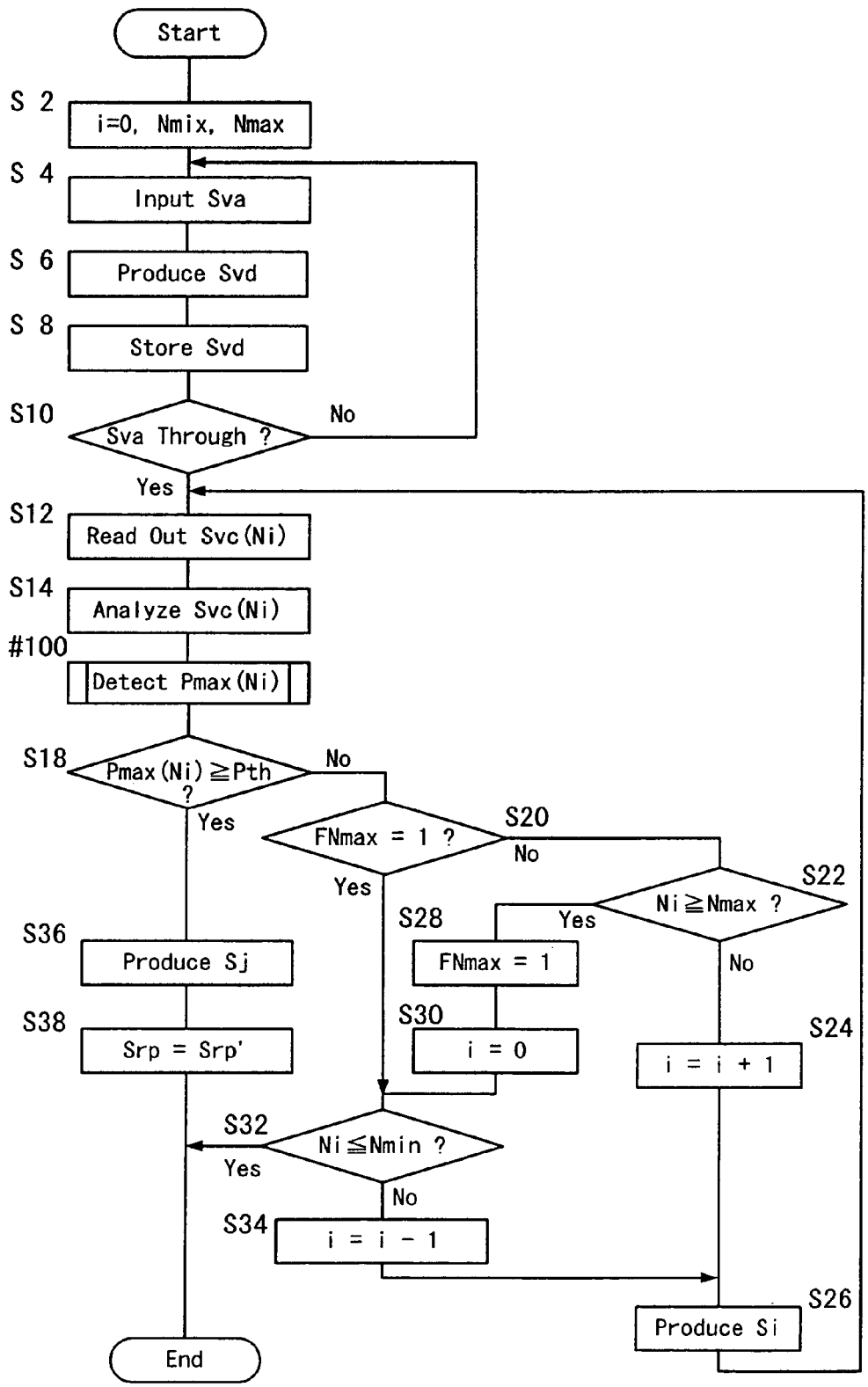
FIG. 5 is a flowchart showing the operation of the voice pitch normalization device of FIG. 1.
Figure 6:
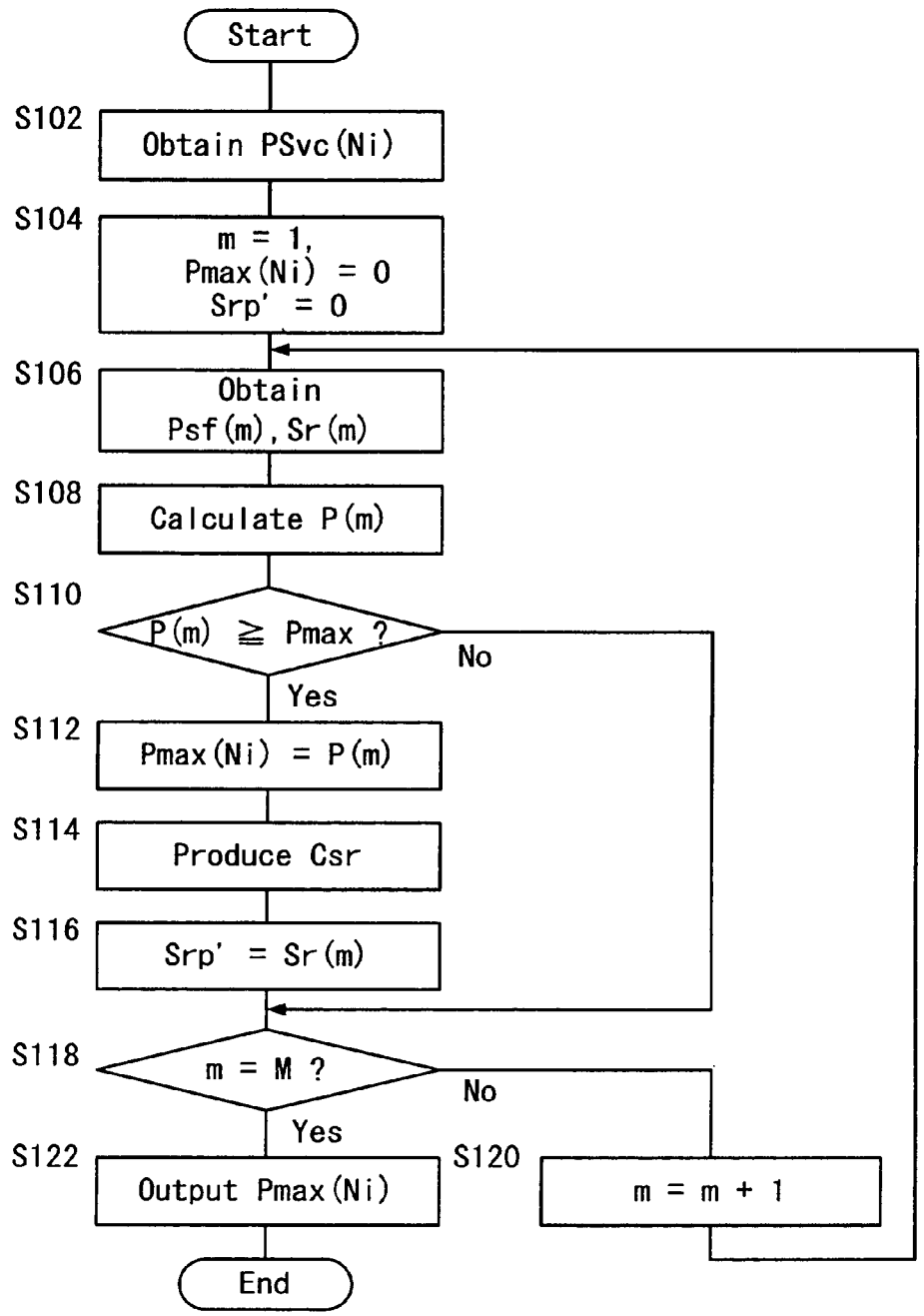
FIG. 6 is a flowchart showing the detailed operation of the voice pitch normalization device in a maximum probability Pmax (Ni) subroutine shown in FIG. 5.
Figure 7:
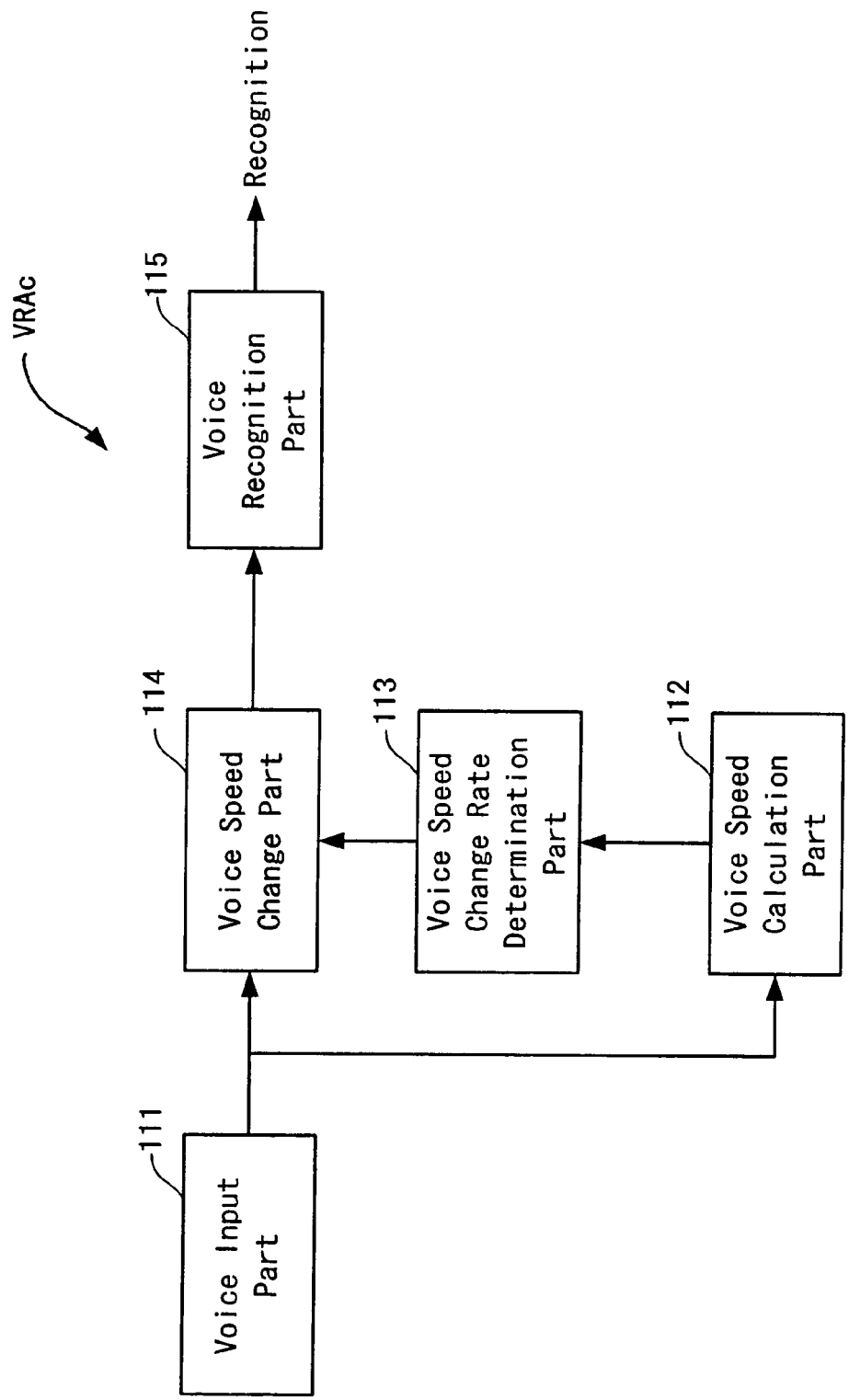
FIG. 7 is a block diagram showing the structure of a conventional voice recognition device.

Referring to FIGS. 5 and 6 for flowcharts, described next is the operation of the constituents in the voice pitch normalization device Tr equipped in the voice recognition device VRAp. Once the voice recognition device VRAp is activated, the operation of voice recognition shown in FIG. 5 is started.

First, in step S2, the voice pitch normalization device Tr is initiated. To be specific, the index i for adjusting the pitch of the pitch-normalized digital voice signal Svc by the degree of Ni is set to 0. Also, after adjusting the pitch-normalized digital voice signal Svc, its allowable maximum and minimum pitches Nmax and Nmin, respectively, are set to a predetermined value. Here, i=0 indicates the pitch-normalized digital voice signal Svc being equal to the digital voice signal Svd in voice pitch. The procedure goes to step S4.

In step S4, a speaker's voice captured through a microphone, for example, is sequentially inputted into an A/D converter 1 as an analog voice signal Sva. The procedure then goes to step S6.

In step S6, the A/D converter 1 subjects the analog voice signal Sva to A/D conversion. Then, thus produced digital voice signal Svd is outputted to the memory 3. The procedure goes to step S8.

In step S8, the memory 3 stores every incoming digital voice signal Svd. The procedure then goes to step S110.

In step S10, the read-out controller 5 monitors the memory 3 for its input status to judge whether the speaker's voice input (analog voice signal Sva) has been through. In this judgement, for example, a length of time having no input of analog voice signal Sva is referred to, to see whether a predetermined reference threshold value has been reached. Alternatively, the speaker may use some appropriate means to inform the voice recognition device VRAp or the voice pitch normalization device Tr that the signal input is now through.

If the speaker keeps speaking, the judgement is No, therefore the procedure returns to step S4 to repeat steps S4, S6, and S8 for inputting the speaker's voice, generating the digital voice signal Svd, and storing the signal in the memory 3. Once the analog voice signal Sva which is an independent voice string structured by one or more sound units uttered by the speaker is completely inputted, the determination becomes Yes. This means that the memory 3 is through with storing the digital voice signal Svd including the voice uttered by the speaker. Therefore, the procedure goes to step S12.

In step S12, the read-out controller 5 refers to the memory 3 for the digital voice signal Svd and the read-out clock Scc stored therein to read out the pitch-normalized digital voice signal Svc(Ni). Here, the pitch-normalized digital voice signal Svc(Ni) is obtained by adjusting (increasing or decreasing) the digital voice signal Svd in voice pitch by a predetermined degree Ni, which is equivalent to the voice pitch adjusting signal Si referred to for generating the read-out clock Scc.

Note herein that, if the pitch-normalized digital voice signal Svc(Ni) is read out from the memory 3 for the first time, the pitch adjustment degree is 0 as the index i has been initialized in step S2. In other words, the digital voice signal Svd is read out as the pitch-normalized digital voice signal Svc(Ni) without being adjusted by voice pitch. The procedure then goes to step S14.

In step S14, as to the pitch-normalized digital voice signal Svc(Ni) thus adjusted in voice pitch by the degree Ni specified by the index i, the voice analyzer 15 subjects the signal to Fourier transform so that a frequency pattern Psvc(Ni) is produced. Thereafter, the frequency spectrum analysis is carried out. The procedure then goes to step #100 for a maximum probability Pmax(Ni) detection subroutine.

In step #100, the frequency pattern Psvc(Ni) of the pitch-normalized digital voice signal Svc(Ni) is compared with the frequency pattern Psf(m) being the sample voice data for each word read out from the sample voice data storage 13, and then the probability P(m) indicating the degree of coincidence therebetween is detected. Such technique for comparing the patterns of digital voice signal and sample voice data with each other for calculating the probability P is typified by the Hidden Markov Model, which is a known technique.

With reference to FIG. 6, described next is the detailed operation in step #100. Once the maximum probability Pmax(Ni) subroutine in step #100 is started, first, in step S102, from the memory 3, the frequency pattern Psvc(Ni) of the pitch-normalized digital voice signal Svc(Ni) is provided to the maximum probability determinator 15a in the voice analyzer 15. The procedure then goes to step S104.

In step S104, the voice analyzer 15 is initialized. Specifically, in the maximum probability determinator 15a, m is set to 1 and the maximum probability Pmax(Ni) to 0. Moreover, in the coincidence authorization code output 15b, the authorization potential code Srp' is set to 0. The procedure then goes to step S106.

In step S106, from the sample voice data storage 13, the frequency pattern Psf(m) and code Sr(m) are inputted into the maximum probability determinator 15a and the coincidence authorization code output 15b, respectively. The procedure then goes to step S108.

In step S108, the maximum probability determinator 15a calculates the probability P(m) indicating the degree of coincidence between the frequency pattern Psvc(Ni) inputted in step S102 and the frequency pattern Psf(m) received in step S106. The procedure then goes to step S110.

In step S110, the maximum probability determinator 15a determines whether or not the maximum probability P(m) is equal to or greater than the maximum probability Pmax. If Yes, the procedure goes to step S112.

In step S112, the current probability P(m) in the maximum probability determinator 15a is set to the maximum probability Pmax(Ni). The procedure then goes to step S114.

In step S114, the maximum probability determinator 15a outputs a code retaining signal Csr to the coincidence authorization code output 15b. The procedure then goes to step S116.

In step S116, the coincidence authorization code output 15b sets, responding to the code retaining signal Csr, the code Sr(m) currently stored therein to the authorization potential code Srp's. The procedure then goes to step S118.

On the other hand, if it is determined as No in step S110, that is, if the probability P(m) is determined as being smaller than the maximum probability Pmax, the procedure skips steps S112, S114, and S116 and goes to step S118.

In step S118, determination is made whether m is equal to M. In the case that m is smaller than M, it is determined as No, and then the procedure goes to step S120.

In step S120, m is incremented by 1, and then the procedure returns to step S106. Thereafter, the processing in steps S106 to S120 is repeated until determination made in step S118 becomes Yes by m becoming equal to M through incrementation.

Determined in step S118 is the probabilities P(m) for the frequency patterns Psf(1) to Psf(M) in the sample voice data stored in the sample voice data storage 13, and which of the calculated probabilities P(m) is the maximum probability Pmax. As such, with respect to every authorization signal Sr stored in the sample voice data storage 13, calculated is the maximum probability Pmax and the authorization potential code Srp'. Then, the procedure goes to step S122.

In step S122, the maximum probability determinator 15a outputs the maximum probability Pmax(Ni) internally stored therein in step S112 to the voice pitch optimizer 9.

In this manner, the voice analyzer 15 looks for the probability P highest among those for the sample voice data (voice frequency patterns Psf) and the voice signal (pitch-normalized digital voice signal Svc) including the incoming command voice (analog voice signal Sva), and then outputs only the sample voice data (coincidence authorization code Srp) showing the maximum Pmax(Ni). This is the end of step #100.

In step S18, the voice pitch optimizer 9 determines whether the maximum probability Pmax(Ni) is equal to or greater than the coincidence reference Pth. In the case that the maximum probability Pmax(Ni) is smaller than the coincidence reference Pth, that is, when it is not sufficient to determine whether voice recognition is correctly done even if the sample voice data shows the highest probability P at the current processing time (i), determined is No and the procedure goes to step S20.

In step S20, referred to is a maximum pitch flag FNmax showing whether the pitch adjustment degree Ni for the pitch-normalized digital voice signal Svc(Ni) has reached an allowable maximum pitch Nmax. In the case that the maximum pitch flag FNmax is not 1, that is, when the pitch adjustment degree Ni has not yet reach the maximum pitch flag FNmax, determined is No, and the procedure goes to step S22.

In step S22, determined is whether the pitch adjustment degree Ni is equal to or greater than the allowable maximum pitch Nmax. If determined is No, the procedure goes to step S24.

In step S24, the index i for adjusting the voice pitch is incremented by 1. This means that the pitch adjustment degree Ni is increased (put higher). The procedure then goes to step S26.

In step S26, the voice pitch optimizer 9 produces a voice pitch adjusting signal Si for output to the read-out clock controller 11. Thereafter, the procedure returns to step S12.

On the other hand, if determined in step S22 is Yes, that is, when the pitch adjustment degree Ni is determined as having reached the allowable maximum pitch Nmax, the procedure goes to step S28.

In step S28, the maximum pitch flag FNmax is set to 1. The procedure then goes to step S30.

In step S30, the index i for adjusting the voice pitch is reset to 0. The procedure then goes to step S32.

In step S32, determined is whether the pitch adjustment degree Ni is equal to or smaller than an allowable minimum pitch Nmin. If determined is No, the procedure goes to step S34.

In step S34, the index i is decremented by 1. This means that the pitch adjustment degree Ni is decreased (put lower). To be more specific, compared with the digital voice signal Svd, the pitch normalized digital voice signal Svc(Ni) is decreased in voice pitch to be lower by the pitch adjustment degree Ni. The procedure then goes to step S26.

On the other hand, if determined in step S32 is Yes, that is, when the pitch adjustment degree Ni is determined as being the allowable minimum pitch Nmin or smaller, this is the end of the procedure. This indicates that the analog voice signal Sva has not been voice recognizable.

In the case that determined in step S20 is Yes, that is, when the maximum pitch flag FNmax is 1 (set in step S28), the procedure goes to step S32.

In the case that determined in step S18 is Yes, that is, when the maximum probability Pmax(Ni) is equal to or greater than the coincidence reference Pth, this indicates that the word (Srp) corresponding thereto is correct. The procedure then goes to step S36.

In step S36, the maximum probability determinator 15a outputs the coincidence authorization signal Sj to the coincidence authorization code output 15b. The procedure then goes to step S38.

In response to the coincidence authorization signal Sj, the coincidence authorization code output 15b outputs, externally to the voice recognition device VRAp, the authorization potential code Srp set in step S116 (#100) as the coincidence authorization code Srp. This is the end of the operation of the voice recognition device VRAp.

By referring to the above-described flowcharts, the operation of the voice recognition device VRAp is described in a specific manner. Once the voice recognition device VRAp is started for its operation of voice recognition, the voice pitch normalization device Tr is initiated in step S2. Accordingly, the pitch adjustment index i is set to 0, and the allowable maximum pitch Nmax and the allowable minimum pitch Nmin are each set to a predetermined value.

In steps S4, S6, S8, and S10, the speaker's voice is stored in the memory 3 as the digital voice signal Svd.

In step S12, the digital voice signal Svd is read from the memory 3 according to the read-out clock Scc(i) which corresponds to the index i (i=0) initialized in step S2. Accordingly, the pitch-normalized digital voice signal Svc (Ni) is outputted to the voice analyzer 15. Here, since i=0, the pitch adjustment degree Ni=0, and the pitch-normalized digital voice signal Svc(Ni) is equal in voice pitch to the digital voice signal Svd.

The voice analyzer 15 carries out the frequency spectrum analysis with respect to the pitch-normalized digital voice signal Svc(Ni) (S14). Moreover, the probabilities P(1) to P(M) are detected for among the frequency pattern Psvc(Ni) of the pitch-normalized digital voice signal Svc(Ni) at i=0 and the frequency patterns Psf(1) to Psf(M) of the sample voice data read from the sample voice storage 13. Thereafter, the sample voice data (authorization potential code Srp') showing the highest probability P thereamong is looked for so that the maximum probability Pmax is calculated. In this manner, the maximum probability Pmax(Ni) corresponding to the current pitch adjustment degree Ni is produced (#100).

When the maximum probability Pmax is equal to or greater than the coincidence reference Pth, the voice pitch optimizer 9 authorizes the voice data (authorization potential code Srp of the word showing the maximum probability Pmax as coinciding with the digital voice signal Svd, i.e., the speaker's voice (S18). The voice pitch optimizer 9 also outputs the coincidence authorization signal Sj (S36) so as to bring the voice analyzer 15 to output the authorization potential code Srp' as the coincidence authorized code Srp (S38).

On the other hand, when the maximum probability Pmax (Ni) is smaller than the coincidence reference Pth, it is determined in step S18 that the voice recognition is not correctly done regardless of the sample voice data showing the highest probability P at that time. Then, in step S20, determination is made whether the pitch adjustment degree Ni has reached its upper limit (i.e., whether the pitch has been adjustably increased) with reference to the maximum pitch flag FNmax for read-out of the pitch-normalized digital voice signal Svc(Ni) from the digital voice signal Svd. If it is determined that the upper limit has not yet been reached, confirmation is made in step S22 that the pitch adjustment degree Ni has not yet reached the allowable maximum pitch Nmax. Then, in step S24, the index i for adjusting the voice pitch is incremented by 1. On the basis of the voice pitch adjusting signal Si indicating the incremented index i, the read-out clock Scc is produced for output to the memory 3.

In step S12, according to the read-out clock Scc, the memory 3 outputs the pitch-normalized digital voice signal Svc(Ni), whose voice pitch is increased by the degree of Ni specified for the digital voice signal Svd by the index i. Thereafter, the processing in steps S20 to S34 is repeated until determination made in step S18 becomes Yes, that is, until the maximum probability Pmax is determined as being equal to or greater than the coincidence reference Pth.

To be more specific, until the pitch adjustment degree Ni is determined as having reached the allowable maximum pitch Nmax in step S22, unless determination made in step S18 becomes Yes, the loops each composed of steps S20 to S26, and S12 to S18 are repeated. In this manner, for every pitch-normalized digital voice signal Svc(Ni) whose voice pitch is increased by the predetermined degree of Ni (S24, S26, S12), the maximum probability Pmax (S14, #100) is calculated.

During such processing, for every increase in pitch of the pitch-normalized digital voice signal Svc(Ni) by degree of Ni, the sample voice data showing the maximum probability Pmax may change. In detail, the sample data showing the maximum probability Pmax at the previous processing time (i−1) does not necessarily show the maximum probability Pmax at the current processing time (i). As such, for every increase by the predetermined degree of Ni, the maximum probability Pmax of the targeted pitch-normalized digital voice signal Svc(Ni) is compared with the coincidence reference Pth. If the maximum probability Pmax is equal to or greater than the coincidence reference Pth, voice recognition is determined as having been done under the best condition, and thus the code Sr corresponding to the sample voice data showing the maximum probability Pmax is outputted as the coincidence authorized code Srp.

As is known from the above, according to the present invention, a condition for optimal voice recognition is set only to the maximum probability Pmax. In this manner, until such condition is satisfied, the pitch adjustment of the pitch-normalized digital voice signal Svc is done by taking all of the sample voice data into consideration regardless of the probability P thereof. In this embodiment, a voice pitch of an incoming analog voice signal Sva (digital voice signal Svd) is taken as a reference (i=0) so that increase in voice pitch is firstly done (S22, S24, S26) by the predetermined degree of Ni. Then, until the condition is determined as being satisfied (S12, S14, # 100) (No in step S18), the pitch is increased up to the allowable maximum pitch Nmax (S22).

In the case that the condition is not determined as being satisfied (No in S18), even if the pitch is increased up to the allowable maximum pitch Nmax, the pitch adjustment is done in a decreasing adjustment mode at this time. The mode can be switched by setting the maximum pitch flag FNmax to 1 (S28) and the index i for adjusting the voice pitch to 0 (S30).

In the decreasing adjustment mode, the maximum pitch flag FNmax is 1 (S20), thereby skipping the processing of increasing the voice pitch (S22, S24). Here, until the pitch adjustment degree Ni reaches the allowable minimum pitch Nmin (No in step S32), the index i is decremented by 1 (S34) so that the voice pitch adjusting signal Si is produced (S34).

As a result of such processing, decreasing in pitch is firstly done by the predetermined degree of Ni by taking the pitch of the analog voice signal Sva (digital voice signal Svd) as a reference (i=0) (S32, S34, S26, S12, S14, #100). Then, until the condition for optimal voice recognition is determined as being satisfied (No in step S18), the pitch is decreased down to the allowable minimum pitch Nmin. If the maximum probability Pmax is not determined as being equal to or greater than the coincidence reference Pth (Yes in step S18) in the modes of increasing and decreasing the voice pitch, the processing is terminated Yes in S32.

In this embodiment, the pitch-normalized digital voice signal Svc is first increased in pitch starting from the pitch level of the digital voice signal Svd up to the allowable maximum pitch Nmax. Note herein that, thereafter, the pitch of the pitch-normalized digital voice signal Svc increased up to the allowable maximum pitch Nmax is put back to the pitch level of the digital voice signal Svd, and then is started to be decreased down to the allowable minimum pitch Nmin. However, decreasing first and then increasing the voice pitch is easier than the above disclosure.

Alternatively, the pitch-normalized digital voice signal Svc may be increased in pitch first all the way to the allowable maximum pitch Nmax, and then decreased down to the allowable minimum pitch Nmin by degrees. This is also easier than the above disclosure.

In the alternative, instead of the range between the allowable minimum pitch Nmin and the allowable maximum pitch Nmax applied to the pitch adjustment, applied may be a range between the pitch level of the digital voice signal Svd and the allowable minimum pitch Nmin, or a range between the pitch level of the digital voice signal Svd and the allowable maximum pitch Nmax. This is also easier than the above disclosure.

As described in the foregoing, in the present invention, the voice pitch is normalized through repeated adjustment under the condition of the maximum probability Pmax satisfying the coincidence reference Pth. In this manner, while taking every word in the sample voice data into consideration for voice recognition, the maximum probability Pmax is only referred to for word selection. Accordingly, data processing is considerably lessened by load, successfully leading to fast and correct voice recognition.

While the invention has been described in detail, the foregoing description is in all aspects illustrative and not restrictive. It is understood that numerous other modifications and variations can be devised without departing from the scope of the invention.

What is claimed is:

1. A voice pitch normalization apparatus for recognizing an incoming command voice uttered by a speaker based on sample data for a plurality of words, said voice pitch normalization apparatus comprising:
   a voice analyzer operable to calculate a probability indicating a degree of coincidence among a target voice signal and each of the plurality of words in the sample data; and
   a voice pitch normalization device operable to generate the target voice signal by changing the incoming command voice on a predetermined degree basis and operable to change the target voice signal in voice pitch until a maximum of probabilities reaches a predetermined probability or higher, wherein
   said voice pitch normalization device is operable to increase or decrease the target voice signal on the predetermined degree basis when the maximum of the probabilities is smaller than the predetermined probability, and
   said voice pitch normalization device comprises:
      a memory operable to temporarily store the incoming command voice;
      a read-out controller operable to read out a string of the incoming command voice from said memory and generate the target voice signal; and
      a read-out clock controller operable to generate a read-out clock signal with a timing clock determined by frequency, and output the timing clock to said memory to change, with a timing specified by the timing clock, a frequency of the target voice signal on the predetermined degree basis.

2. A voice pitch normalization apparatus for recognizing an incoming command voice uttered by a speaker based on sample data for a plurality of words, said voice pitch normalization apparatus comprising:
   a voice pitch normalization device operable to change a target voice signal in voice pitch on a predetermined degree basis; and
   a voice analyzer operable to calculate probabilities each indicating a degree of coincidence between the target voice signal and a different one of the plurality of words in the sample data, and calculate a maximum probability among the probabilities, wherein
   until the maximum probability is equal to or greater than a predetermined probability, said voice pitch normalization apparatus is operable to cause said voice pitch normalization device to change the target voice signal in pitch and said voice analyzer to calculate the maximum probability based on the changed target voice signal, and
   said voice pitch normalization device is operable to increase the target voice signal in voice pitch on the predetermined degree basis when the maximum probability is smaller than the predetermined probability starting from a pitch level of the incoming command voice.

3. A voice pitch normalization apparatus for recognizing an incoming command voice uttered by a speaker based on sample data for a plurality of words, said voice pitch normalization apparatus comprising:
   a voice pitch normalization device operable to change a target voice signal in voice pitch on a predetermined degree basis; and
   a voice analyzer operable to calculate probabilities each indicating a degree of coincidence between the target voice signal and a different one of the plurality of words in the sample data, and calculate a maximum probability among the probabilities, wherein until the maximum probability is equal to or greater than a predetermined probability, said voice pitch normalization apparatus is operable to cause said voice pitch normalization device to change the target voice signal in pitch and said voice analyzer to calculate the maximum probability based on the changed target voice signal, and said voice pitch normalization device is operable to decrease the target voice signal in voice pitch on the predetermined degree basis when the maximum probability is smaller than the predetermined probability starting from a pitch level of the incoming command voice.

4. A voice recognition device for recognizing an incoming command voice optimally normalized for voice recognition based on sample data for a plurality of words, said voice recognition device comprising:

a voice pitch normalization device operable to change a target voice signal in voice pitch on a predetermined degree basis; and a voice analyzer operable to calculate probabilities each indicating a degree of coincidence between the target voice signal and a different one of the plurality of words in the sample data, and calculate a maximum probability among the probabilities, wherein until the maximum probability is equal to or greater than a predetermined probability, said voice recognition device is operable to cause said voice pitch normalization device to change the target voice signal in pitch and said voice analyzer to calculate the maximum probability based on the changed target voice signal, said voice pitch normalization device is operable to increase or decrease the target voice signal on the predetermined degree basis when the maximum probability is smaller than the predetermined probability, and said voice pitch normalization device comprises:
 a memory operable to temporarily store the incoming command voice;
 a read-out controller operable to read out a string of the incoming command voice from said memory and generate the target voice signal; and
 a read-out clock controller operable to generate a read-out clock signal with a timing clock determined by frequency, and output the timing clock to said memory to change, with a timing specified by the timing clock, a frequency of the target voice signal on the predetermined degree basis.

5. A voice recognition device for recognizing an incoming command voice optimally normalized for voice recognition based on sample data for a plurality of words, said voice recognition device comprising:

a voice pitch normalization device operable to change a target voice signal in voice pitch on a predetermined degree basis; and a voice analyzer operable to calculate probabilities each indicating a degree of coincidence between the target voice signal and a different one of the plurality of words in the sample data, and calculate a maximum probability among the probabilities, wherein until the maximum probability is equal to or greater than a predetermined probability, said voice recognition device is operable to cause said voice pitch normalization device to change the target voice signal in pitch and said voice analyzer to calculate the maximum probability based on the changed target voice signal, and said voice pitch normalization device is operable to increase the target voice signal in voice pitch on the predetermined degree basis when the maximum probability is smaller than the predetermined probability starting from a pitch level of the incoming command voice.

6. A voice recognition device for recognizing an incoming command voice optimally normalized for voice recognition based on sample data for a plurality of words, said voice recognition device comprising:

a voice pitch normalization device operable to change a target voice signal in voice pitch on a predetermined degree basis; and a voice analyzer operable to calculate probabilities each indicating a degree of coincidence between the target voice signal and a different one of the plurality of words in the sample data, and calculate a maximum probability among the probabilities, wherein until the maximum probability is equal to or greater than a predetermined probability, said voice recognition device is operable to cause said voice pitch normalization device to change the target voice signal in pitch and said voice analyzer to calculate the maximum probability based on the changed target voice signal, and said voice pitch normalization device is operable to decrease the target voice signal in voice pitch on the predetermined degree basis when the maximum probability is smaller than the predetermined probability starting from a pitch level of the incoming command voice.

7. A voice pitch normalization method for recognizing an incoming command voice uttered by a speaker based on sample data for a plurality of words, said voice pitch normalization method comprising:

temporarily storing the incoming command voice;

generating a target voice signal from a string of the temporarily stored incoming command voice;

changing the target voice signal in voice pitch on a predetermined degree basis;

calculating probabilities each indicating a degree of coincidence between the target voice signal and a different one of the plurality of words in the sample data;

calculating a maximum probability among the probabilities;

when the maximum probability is smaller than a predetermined probability, one of increasing and decreasing the target voice signal on the predetermined degree basis; and determining a timing clock by frequency, in such manner as to change, with a timing specified by the timing clock, a frequency of the target voice signal on the predetermined degree basis, wherein until the maximum probability is equal to or greater than the predetermined probability, said changing of the target voice signal comprises changing the target voice signal in pitch, and said calculating of the maximum probability comprises calculating the maximum probability based on the changed target voice signal.

8. A voice pitch normalization method for recognizing an incoming command voice uttered by a speaker based on sample data for a plurality of words, said voice pitch normalization method comprising:

changing a target voice signal in voice pitch on a predetermined degree basis;

calculating probabilities each indicating a degree of coincidence between the target voice signal and a different one of the plurality of words in the sample data;

calculating a maximum probability among the probabilities;

when the maximum probability is smaller than a predetermined probability, one of increasing and decreasing the target voice signal on the predetermined degree basis; and increasing the target voice signal in voice pitch on the predetermined degree basis starting from a pitch level of the incoming command voice, wherein until the maximum probability is equal to or greater than the predetermined probability, said changing of the target voice signal comprises changing the target voice signal in pitch, and said calculating of the maximum probability comprises calculating the maximum probability based on the changed target voice signal.

9. A voice pitch normalization method for recognizing an incoming command voice uttered by a speaker based on sample data for a plurality of words, said voice pitch normalization method comprising:

changing a target voice signal in voice pitch on a predetermined degree basis;

calculating probabilities each indicating a degree of coincidence between the target voice signal and a different one of the plurality of words in the sample data;

calculating a maximum probability among the probabilities;

when the maximum probability is smaller than the predetermined probability, one of increasing and decreasing the target voice signal on the predetermined degree basis; and decreasing the target voice signal in voice pitch on the predetermined degree basis starting from a pitch level of the incoming command voice, wherein until the maximum probability is equal to or greater than the predetermined probability, said changing of the target voice signal comprises changing the target voice signal in pitch, and said calculating of the maximum probability comprises calculating the maximum probability based on the changed target voice signal.

* * * * *